(12) United States Patent
Chakalian et al.

(10) Patent No.: US 11,960,453 B2
(45) Date of Patent: Apr. 16, 2024

(54) TECHNIQUES FOR ASYNCHRONOUS SNAPSHOT INVALIDATION

(71) Applicant: NetApp Inc., San Jose, CA (US)

(72) Inventors: Mardiros Z. Chakalian, San Jose, CA (US); Amber Palekar, San Jose, CA (US); Szu-Wen Kuo, Cupertino, CA (US); Stephen Wu, Sacramento, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/176,028

(22) Filed: Feb. 28, 2023

(65) Prior Publication Data

US 2023/0214363 A1 Jul. 6, 2023

Related U.S. Application Data

(63) Continuation of application No. 17/100,896, filed on Nov. 22, 2020, now Pat. No. 11,593,318, which is a continuation of application No. 16/015,730, filed on Jun. 22, 2018, now Pat. No. 10,853,328, which is a continuation of application No. 14/840,554, filed on Aug. 31, 2015, now abandoned.

(60) Provisional application No. 62/107,319, filed on Jan. 23, 2015.

(51) Int. Cl.
*G06F 17/00* (2019.01)
*G06F 16/182* (2019.01)

(52) U.S. Cl.
CPC ................ *G06F 16/1827* (2019.01)

(58) Field of Classification Search
CPC .......................... G06F 16/1827; G06F 3/067
See application file for complete search history.

(56) References Cited

U.S. PATENT DOCUMENTS

| 6,311,193 | B1 | 10/2001 | Sekido |
| 7,478,211 | B2 | 1/2009 | Shackelford et al. |
| 7,827,368 | B2 | 11/2010 | Ebata |
| 8,135,678 | B1 * | 3/2012 | Chen ............... G06F 16/10 707/674 |

(Continued)

OTHER PUBLICATIONS

Chan. H., et al., "An Approach to High Availability for Cloud Servers with Snapshot Mechanism," Middleware, Proceedings of the International Track of the 13th ACM/IFIP/USENIX, Dec. 2012, Article No. 6, pp. 1-6.

*Primary Examiner* — Greta L Robinson
(74) *Attorney, Agent, or Firm* — Cooper Legal Group, LLC

(57) ABSTRACT

Asynchronous snapshot invalidation techniques are described. According to various such techniques, an enhanced file handle structure may be defined that includes a snapshot generation ID that is to comprise a value that singularly identifies a snapshot performed at a particular point in time. In some embodiments, when a snapshot ID assigned to that snapshot is reused at a subsequent point in time, a different snapshot generation ID may be assigned to that subsequent snapshot. With respect to an in-core cache, the differing snapshot generation IDs may eliminate unacceptable ambiguity regarding respective file information sets corresponding to the initial and subsequent snapshots sharing the same snapshot ID. As a result, obsolete file information sets may be cleared from the in-core cache asynchronously, enabling improved performance. The embodiments are not limited in this context.

20 Claims, 11 Drawing Sheets

(56) References Cited

U.S. PATENT DOCUMENTS

| | | |
|---|---|---|
| 9,069,780 B2 * | 6/2015 | Zuckerman ......... G06F 16/9017 |
| 9,152,338 B2 * | 10/2015 | Eggers .................. G06F 3/0626 |
| 9,436,693 B1 | 9/2016 | Lockhart et al. |
| 9,678,981 B1 * | 6/2017 | Taylor ................... G06F 16/182 |
| 10,853,328 B2 | 12/2020 | Chakalian et al. |
| 11,593,318 B2 | 2/2023 | Chakalian et al. |
| 2004/0030668 A1 | 2/2004 | Pawlowski et al. |
| 2005/0065986 A1 | 3/2005 | Bixby et al. |
| 2008/0098173 A1 | 4/2008 | Chidambaran et al. |
| 2013/0198456 A1 | 8/2013 | Harrison et al. |
| 2016/0217175 A1 | 7/2016 | Palekar et al. |

* cited by examiner

*FIG. 9*

Storage Medium 900

Computer Executable Instructions for 700

Computer Executable Instructions for 800

TECHNIQUES FOR ASYNCHRONOUS SNAPSHOT INVALIDATION

RELATED CASE

This application claims priority to and is a continuation of U.S. Application No. 17/100,896, filed on Nov. 22, 2020, presently titled "TECHNIQUES FOR ASYNCHRONOUS SNAPSHOT INVALIDATION", which claims priority to and is a continuation of U.S. Pat. No. 10,853,328, filed on Jun. 22, 2018, presently titled "TECHNIQUES FOR ASYNCHRONOUS SNAPSHOT INVALIDATION", which claims priority to and is a continuation of U.S. application Ser. No. 14/840,554, filed on Aug. 31, 2015, titled "TECHNIQUES FOR ASYNCHRONOUS SNAPSHOT INVALIDATION", which claims priority to U.S. Provisional Patent Application No. 62/107,319, filed Jan. 23, 2015, which are incorporated herein.

BACKGROUND

In a data storage system such as a network-attached storage system or a storage area network, a file server appliance that manages a file system may store file information sets in an in-core cache in order to reduce access times associated with access to particular files of that file system. Some file information sets that are stored in the in-core cache may correspond to files associated with previously generated snapshots of the file system. Such file information sets may comprise file handles that contain snapshot identifiers (IDs) associated with the snapshots to which they correspond. The number of different permissible snapshot IDs may correspond to the number of different snapshots of the file system that may be concurrently maintained. During ongoing operation, the file server appliance may generate snapshots of the file system on an ongoing basis. Once all of the permissible snapshot IDs have been used, the file server appliance may need to reuse one of those snapshot IDs when generating a new snapshot. In the absence of a mechanism for differentiating between file information sets associated with a given snapshot that assigned a particular snapshot ID and a previous or subsequent snapshot that is assigned that same snapshot ID, the reuse of a snapshot ID may create the potential for ambiguity regarding file information sets in the in-core cache.

BRIEF DESCRIPTION OF THE DRAWINGS

FIG. 9 illustrates one embodiment of a storage medium.

DETAILED DESCRIPTION

Various embodiments are generally directed to techniques for asynchronous snapshot invalidation. According to various such techniques, an enhanced file handle structure may be defined that includes a snapshot generation ID that is to comprise a value that singularly identifies a snapshot performed at a particular point in time. In some embodiments, when a snapshot ID assigned to that snapshot is reused at a subsequent point in time, a different snapshot generation ID may be assigned to that subsequent snapshot. With respect to an in-core cache, the differing snapshot generation IDs may eliminate unacceptable ambiguity regarding respective file information sets corresponding to the initial and subsequent snapshots sharing the same snapshot ID. As a result, it may not be necessary to clear obsolete file information sets from the in-core cache at the time that a snapshot ID is reused—such clearing may be performed asynchronously instead, enabling improved performance. The embodiments are not limited in this context.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
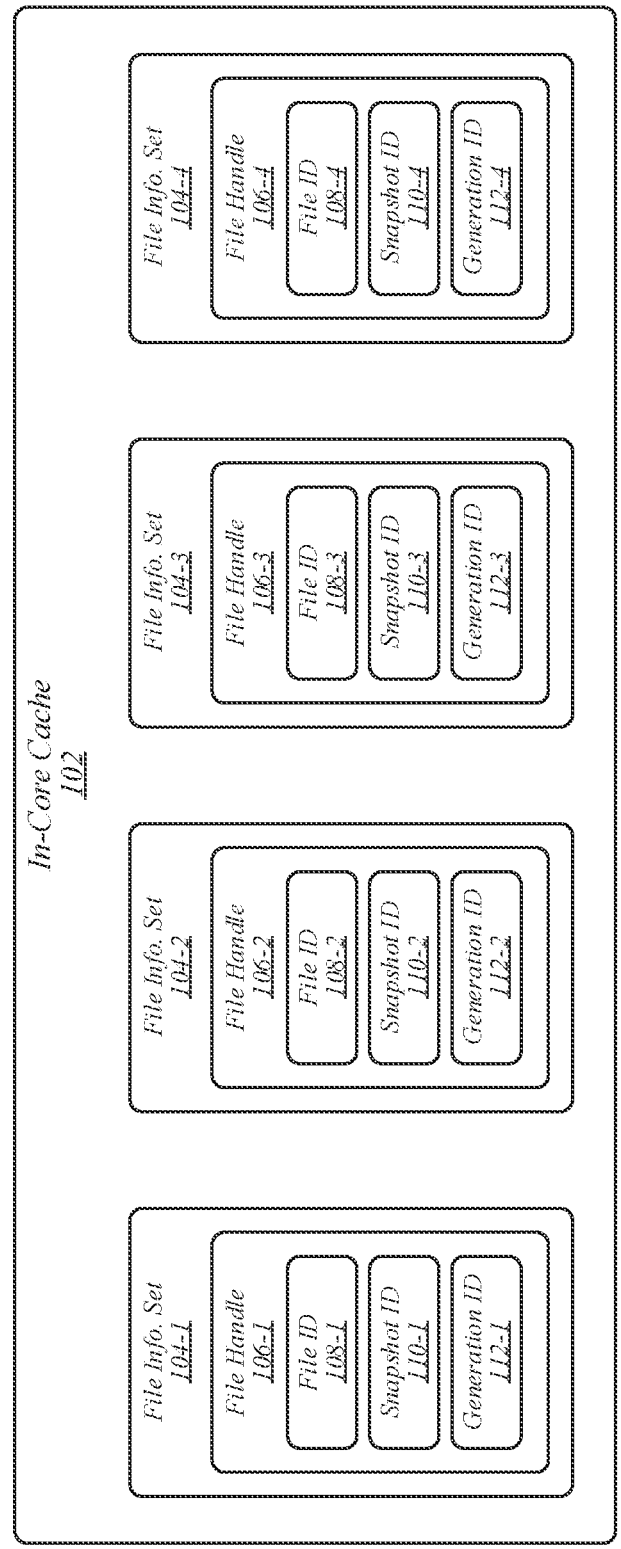
FIG. 1 illustrates one embodiment of a first operating environment.

FIG. 1 illustrates an operating environment 100 such as may be representative of various embodiments. In operating environment 100, a plurality of file information sets 104-1 to 104-4 are stored in an in-core cache 102. In some embodiments, in-core cache 102 may comprise one or more memory locations of a file server appliance or other apparatus/system that generates and manages snapshots of a file system and facilitates client access to files of that file system. In various embodiments, each file information set 104-1 to 104-4 may comprise information associated with a respective index node (inode) or other data structure used to represent a file in a file system. In the interest of simplicity, FIG. 1 depicts a scenario in which in-core cache 102 comprises only four file information sets 104-1 to 104-4. However, it is to be appreciated that in some embodiments, in-core cache 102 may comprise greater or lesser numbers of file information sets, and that the embodiments are not limited to this example.

In operative environment 100, file information sets 104-1 to 104-4 comprise respective file handles 106-1 to 106-4. File handles 106-1 to 106-4 comprise respective file identifiers (IDs) 108-1 to 108-4, snapshot IDs 110-1 to 110-4, and generation IDs 112-1 to 112-4. In various embodiments, file IDs 108-1 to 108-4 may comprise respective identifiers of the inodes or other data structures to which file information sets 104-1 to 104-4 correspond. In some embodiments, snapshot IDs 110-1 to 110-4 may comprise respective identifiers for snapshots with which file information sets 104-1 to 104-4 are associated. In various embodiments, generation IDs 112-1 to 112-4 may comprise respective identifiers for generation numbers associated with file system files to which file information sets 104-1 to 104-4 correspond. In some embodiments, file information sets 104-1 to 104-4 and/or file handles 106-1 to 106-4 may comprise other information in addition to that depicted in FIG. 1. For example, in various embodiments, file handles 106-1 to 106-4 may also comprise respective file system IDs that indicate a file system with which they are associated. The embodiments are not limited to this example.

In some embodiments, during ongoing operation of a data storage system, a file server appliance may periodically generate snapshots of a file system. In various embodiments, the file server appliance may periodically store file information sets in in-core cache 102 in order to facilitate access to the file system files to which they correspond. In some embodiments, it may be possible for two file information sets to correspond to a same file system file. For example, a first file information set for a file system file may correspond to a first snapshot, and a second file information set for that file system file may correspond to a second, subsequent snapshot. In such a scenario, the two file information sets may comprise like file IDs and generation IDs, but it may be possible to differentiate between the two file information sets based on their snapshot IDs.

Figure 2:
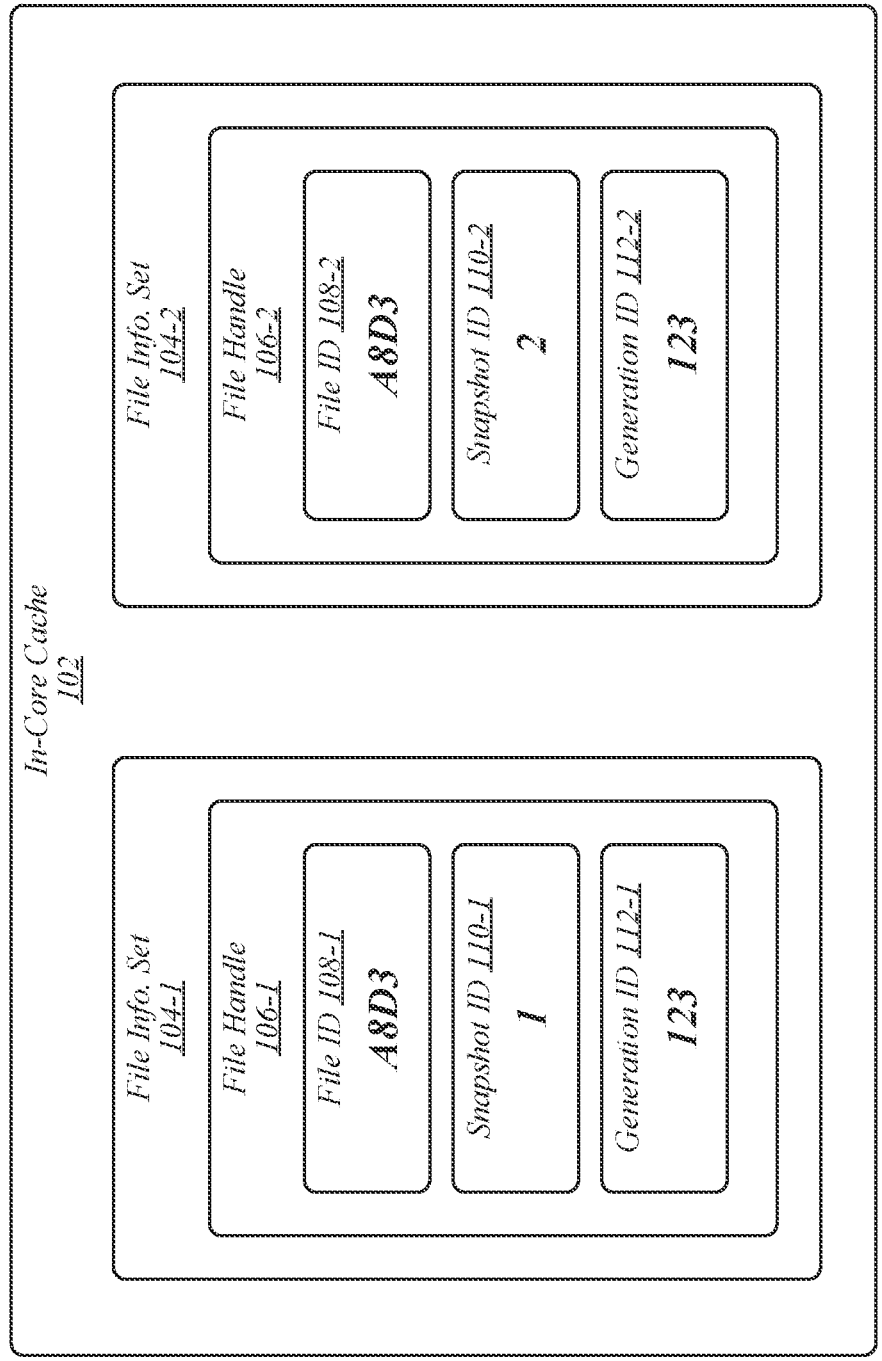
FIG. 2 illustrates one embodiment of a second operating environment.

FIG. 2 illustrates an operating environment 200 such as may be representative of such a scenario. In operating environment 200, file information sets 104-1 and 104-2 both correspond to a same file system file, but correspond to different snapshots. In this example, file IDs 108-1 and 108-2 comprise a same value 'A8D3', and generation IDs 112-1 and 112-2 comprise a same value '123'. However, snapshot ID 110-1 comprises a different value than snapshot ID 110-2. In this example, snapshot ID 110-1 comprises a value '1', while snapshot ID 110-2 comprises a value '2'. When a file server appliance accesses an in-core cache containing file information sets 104-1 and 104-2 that comprise these respective values, it may differentiate between the two file information sets based on their different snapshot IDs. The embodiments are not limited to this example.

In various embodiments, there may be a limit to the number of distinct snapshots that may be concurrently maintained for a given file system. For example, in some embodiments, up to 256 distinct snapshots may be concurrently maintained for a given file system. In various embodiments, the set of permissible values for snapshot IDs such as snapshot IDs 110-1 and 110-2 may be defined to reflect such a limit. For example, in some embodiments in which up to 256 distinct snapshots may be concurrently maintained for a given file system, each snapshot ID may comprise a value in the range 0-255. The embodiments are not limited to this example.

In various embodiments, during normal operation, a file server appliance may generate snapshots of a file system on an ongoing, periodic basis. In some embodiments, the file server appliance may additionally or alternatively perform aperiodic generation of snapshots of the file system in response to triggering events, user input, or other stimuli. In various embodiments, once the maximum permissible number of concurrently maintained snapshots is reached, the file server appliance may need to reuse a previously assigned snapshot ID in assigning a snapshot ID to a new snapshot. For example, in operating environment 200, as time passes following the assignments of snapshot IDs '1' and '2' to the snapshots to which file information sets 104-1 and 104-2 correspond, the file server appliance may periodically generate additional snapshots, to which other snapshot IDs may be assigned in ascending order. The order of snapshot ID assignment may progress through '255' and eventually "wrap around" and return to the value of '1'. Thus, when the file server appliance generates a next snapshot, it may assign a snapshot ID value of '1' to that snapshot. In some embodiments, at the time that the snapshot ID value of '1' is reused, there may still be file information sets in the in-core cache 102 that correspond to the previous snapshot to which the snapshot ID value of '1' was assigned. In various embodiments, this may potentially give rise to ambiguity regarding the file information sets stored in the in-core cache 102.

Figure 3:
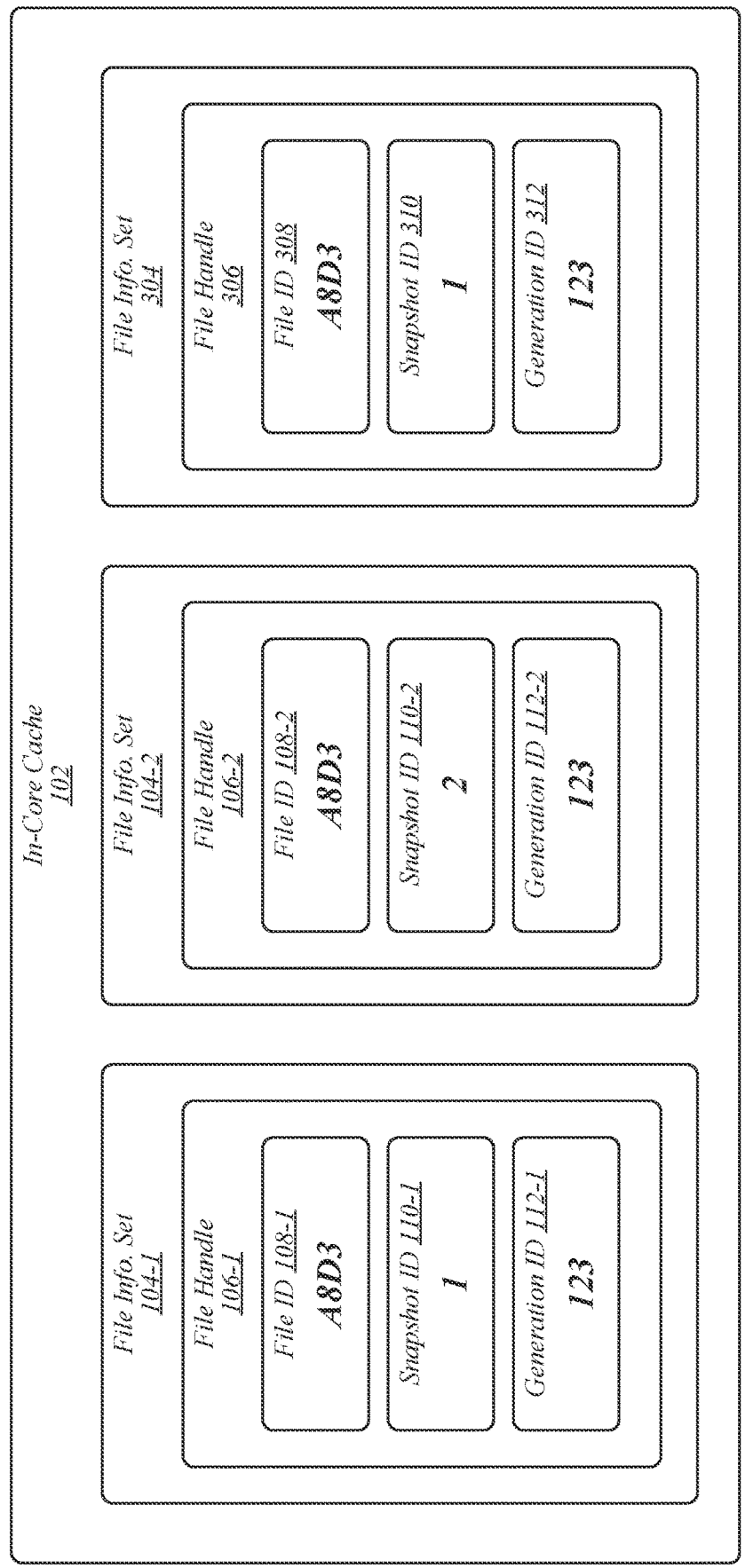
FIG. 3 illustrates one embodiment of a third operating environment.

FIG. 3 illustrates an operating environment 300 such as may be representative of such an embodiment. In operating environment 300, in-core cache 102 comprises a file information set 304 that corresponds to a same file system file as do file information sets 104-1 and 104-2. File information set 304 comprises a file handle 306, which contains a file ID 308 comprising the same value 'A8D3' as do file IDs 108-1 and 108-2, and contains a generation ID 312 comprising the same value '123' as do generation IDs 112-1 and 112-2. File information set 304 may be differentiated from file information set 104-2 on the basis of snapshot ID, since file information set 304 contains a snapshot ID 310 comprising the value '1', which differs from the value '2' comprised in the snapshot ID 110-2 of file information set 104-2. However, even though file information set 304 corresponds to a different snapshot than does file information set 104-1, file information set 304 cannot be differentiated from file information set 104-1 on the basis of snapshot ID, since both comprise snapshot ID values of '1'. If no supplemental basis is defined for differentiation between file information sets 104-1 and 304, then the two may be indistinguishable from the perspective of the file server appliance. Since such ambiguity may be unacceptable, the file server appliance may need to delete file information set 104-1 from in-core cache 102 before it writes file information set 304 to in-core cache 102.

In a typical data storage system, the in-core cache may contain thousands of file information sets associated with hundreds of different snapshot IDs. At a given point in time at which a file server appliance reuses a snapshot ID, there may be a substantial number of file information sets in the in-core cache that are associated with a snapshot to which that snapshot ID was previously assigned. As such, in the absence of a mechanism for eliminating ambiguity such as that depicted in FIG. 3, a substantial number of file information sets may need to be cleared from the in-core cache each time a snapshot ID is reused. The need to clear file information sets from the in-core cache may constitute a significant source of latency, especially when new snapshots are generated relatively frequently. This latency may constitute a significant performance bottleneck, especially as it occurs in the critical path for the maintenance of file system consistency points.

Disclosed herein are techniques for asynchronous snapshot invalidation such as may be implemented in some embodiments in order to avoid the undesirable latency that may result from needing to clear old file information sets from the in-core cache when reusing a snapshot ID. According to various such techniques, an enhanced file handle structure may be defined that includes a snapshot generation ID that is to comprise a value that singularly identifies a snapshot performed at a particular point in time. In some embodiments, when a snapshot ID assigned to that snapshot is reused at a subsequent point in time, a different snapshot generation ID may be assigned to that subsequent snapshot. With respect to the in-core cache, the differing snapshot generation IDs may eliminate unacceptable ambiguity regarding respective file information sets corresponding to the initial and subsequent snapshots sharing the same snapshot ID. As a result, it may not be necessary to clear obsolete file information sets from the in-core cache at the time that a snapshot ID is reused—such clearing may be performed asynchronously instead, enabling improved performance. The embodiments are not limited in this context.

Figure 4:
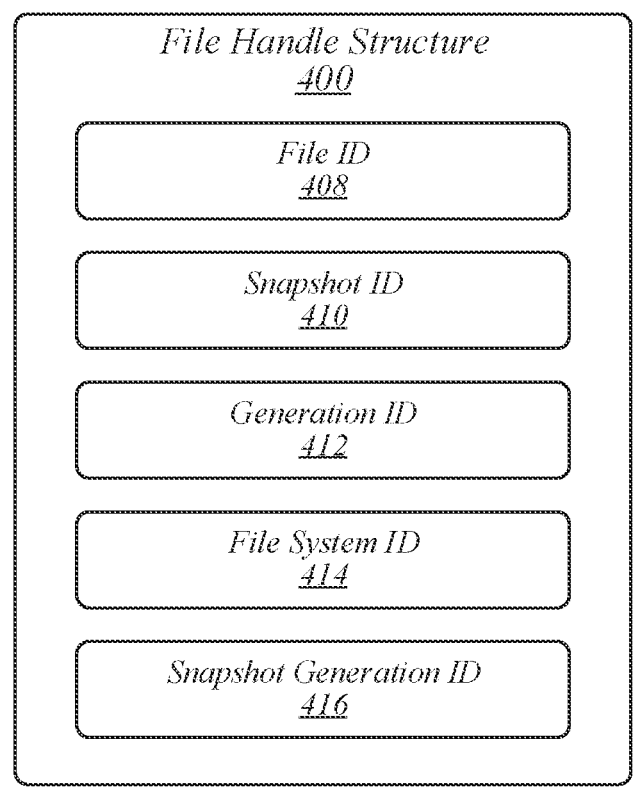
FIG. 4 illustrates one embodiment of a file handle structure.

FIG. 4 illustrates a file handle structure 400 that may be representative of an enhanced file handle structure that may be implemented in conjunction with techniques for asynchronous snapshot invalidation in various embodiments. As shown in FIG. 4, file handle structure 400 may comprise a file ID 408, a snapshot ID 410, a generation ID 412, and a file system ID 414. File ID 408 may comprise an identifier of an inode or other data structure, and may be the same as—or similar to—file IDs 108-1 to 108-4. Snapshot ID 410 may be the same as—or similar to—snapshot IDs 110-1 to 110-4, and may comprise a snapshot ID selected from among a set of permitted snapshot ID values. For example, in some embodiments in which up to 256 snapshots may be concurrently maintained, snapshot ID 410 may comprise an integer value in the range 0-255. Generation ID 412 may identify a generation number associated with a file system file to which a file information set comprising file handle structure 400 corresponds, and may be the same as—or similar to—generation IDs 112-1 to 112-4. File system ID 414 may comprise a value identifying a file system that contains the file system file to which a file information set comprising file handle structure 400 corresponds. It is worthy of note that file handles 106-1 to 106-4 and 306 may also comprise file system IDs. The embodiments are not limited in this context.

File handle structure 400 also comprises a snapshot generation ID 416. In various embodiments, each time a snapshot is generated for the file system identified by file system ID 414, the newly generated snapshot may be assigned a snapshot generation ID that differs from each of those assigned to previously generated snapshots of that file system. In some embodiments, the value of snapshot generation ID 416 may uniquely identify a single particular snapshot of the file system, and may be used to differentiate that snapshot from others sharing the same snapshot ID 410. In various embodiments, the snapshot generation ID may be incremented for each successive snapshot of a given file system. In some other embodiments, the snapshot generation ID may be decremented for each successive snapshot of a given file system. In yet other embodiments, the each successive snapshot generation ID value may be determined according to any suitable random or pseudo-random number generating scheme that does not reuse numbers, or according to some other scheme for generating a non-repeating series of numbers. In some embodiments, each snapshot generation ID may comprise a length of 32 bits (4 bytes). In various other embodiments, each snapshot generation ID may comprise a length of 64 bits (8 bytes). The embodiments are not limited to these examples.

Figure 5:
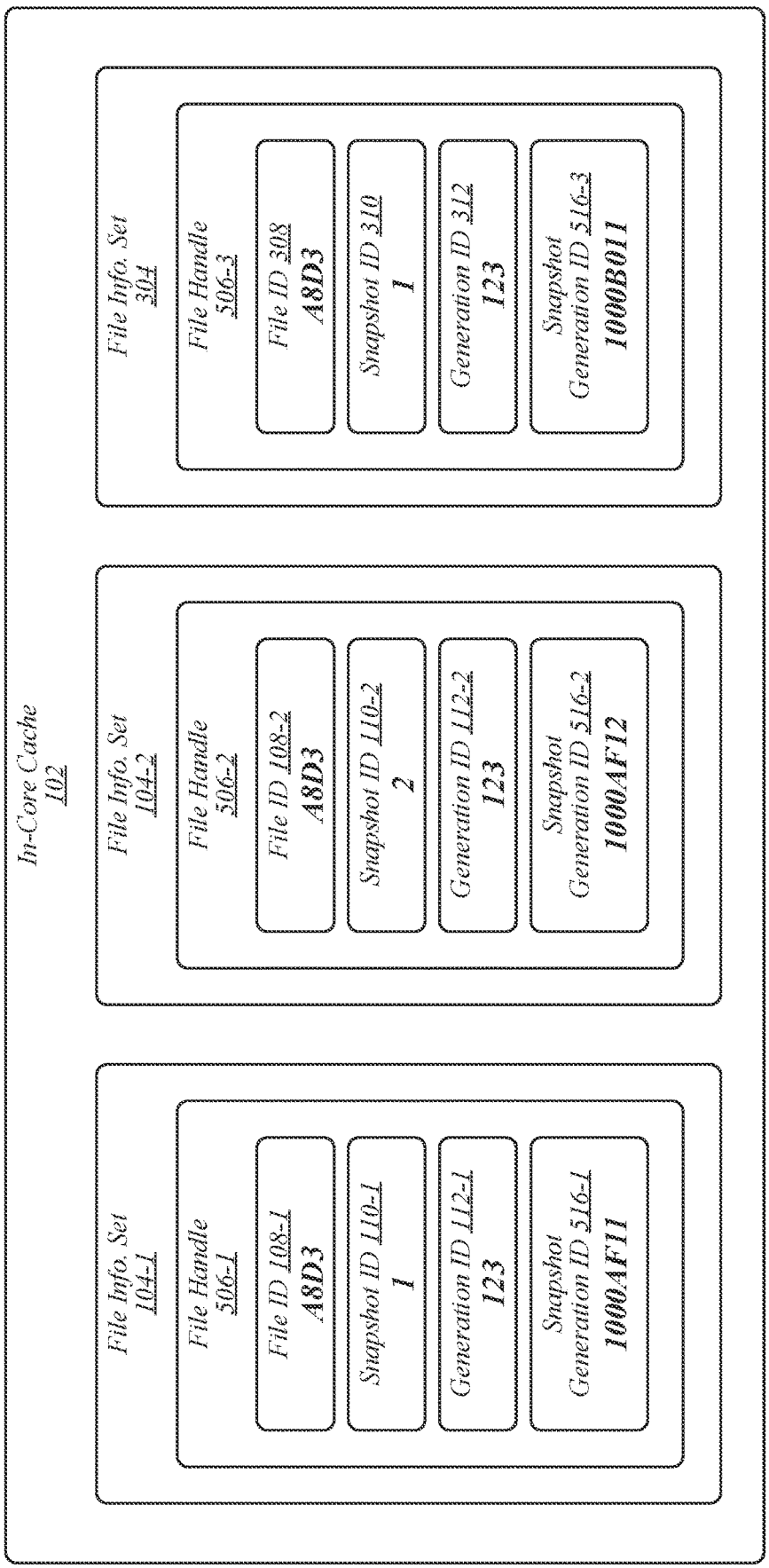
FIG. 5 illustrates one embodiment of a fourth operating environment.

FIG. 5 illustrates an operating environment 500 such as may be representative of various embodiments in which enhanced file structure 400 of FIG. 4 is utilized. More particularly, operating environment 500 may be representative of some embodiments in which the use of enhanced file structure 400 may eliminate the ambiguity that exists in operating environment 300 of FIG. 3. In operating environment 500, as in operating environment 300, file information sets 104-1, 104-2 and 304 are stored in in-core cache 102. However, in operating environment 500, file information sets 104-1, 104-2 and 304 comprise respective file handles 506-1, 506-2, and 506-3 that are structured according to enhanced file handle structure 400. It is worthy of note that although file system IDs have been omitted from file handles 506-1, 506-2, and 506-3 due to spatial limitations, each may also comprise a respective file system ID in various embodiments, which may be the same as—or similar to—file system ID 414 of FIG. 4. The embodiments are not limited in this context.

In operating environment 500, file handles 506-1, 506-2, and 506-3 comprise respective snapshot generation IDs 516-1, 516-2, and 516-3, the values of which differ from each other. Notably, the values of snapshot generation IDs 516-1 and 516-3 differ from each other, despite the fact that the values of file IDs 108-1 and 308, snapshot IDs 110-1 and 310, and generation IDs 112-1 and 312 do not differ between file handle 506-1 and 506-3. These differing snapshot generation ID values eliminate ambiguity regarding the particular snapshots to which file information sets 104-1 and 304 correspond.

Further, they may be compared to a snapshot generation ID that is currently associated with the snapshot ID value of '1' in order to identify one or both of file information sets 104-1 and 304 as corresponding to a stale snapshot. In some embodiments, a snapshot generation ID that is currently associated with a given snapshot ID value may be specified by information comprised in a set of snapshot attributes for that snapshot ID value. Thus, in operating environment 500, a snapshot generation ID that is currently associated with the snapshot ID value of '1' may be identified by accessing a set of snapshot attributes for the snapshot ID value of '1'. Among file information sets that comprise the snapshot ID value of '1', those that do not comprise the current snapshot generation ID for the snapshot ID value of '1' may then be identified as corresponding to stale snapshots. For example, if the current snapshot generation ID for snapshot ID value '1' is not '1000AF11', then file handle 506-1 may be identified as corresponding to a stale snapshot. Likewise, if the current snapshot generation ID for snapshot ID value '1' is not '1000B011', then file handle 506-3 may be identified as corresponding to a stale snapshot. If the current snapshot generation ID for snapshot ID value '1' is neither '1000AF11' nor '1000B011', then file handles 506-1 and 506-3 may both be identified as corresponding to stale snapshots. The ability to use snapshot generation ID values in this fashion to identify file information sets associated with stale snapshots may enable a file server appliance to leave such file information sets in in-core cache 102 for subsequent asynchronous deletion. The embodiments are not limited in this context.

Figure 6:
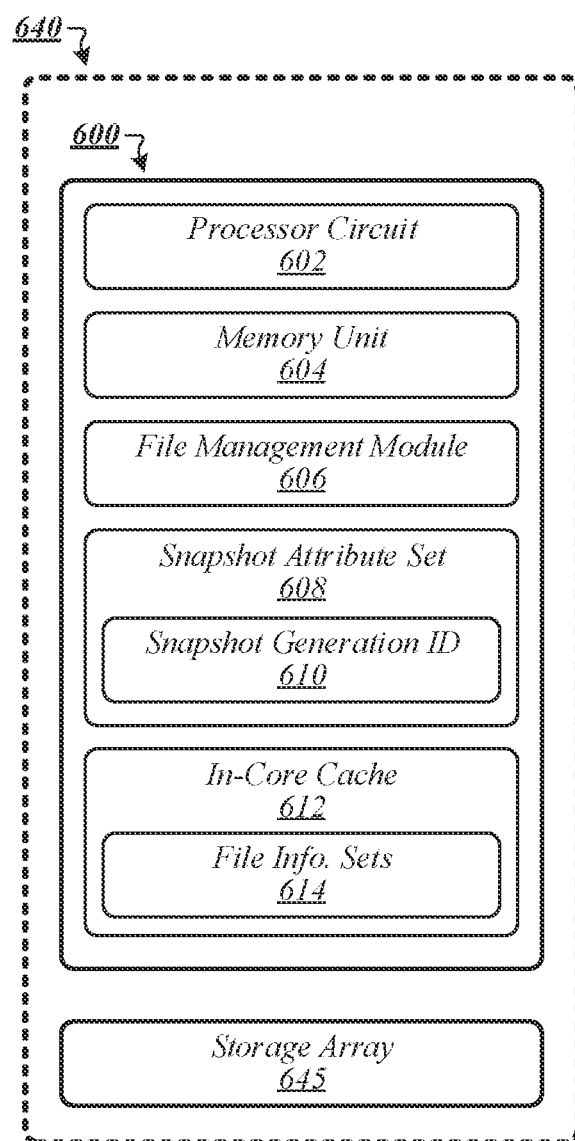
FIG. 6 illustrates one embodiment of an apparatus and one embodiment of a system.

FIG. 6 illustrates a block diagram of an apparatus 600 that may implement improved techniques for asynchronous snapshot invalidation in various embodiments. Apparatus 600 may be representative of a storage server or other node in a data storage system according to some embodiments. As shown in FIG. 6, apparatus 600 comprises multiple elements including a processor circuit 602, a memory unit 604, and a file management module 606. The embodiments, however, are not limited to the type, number, or arrangement of elements shown in this figure.

In various embodiments, apparatus 600 may comprise processor circuit 602. Processor circuit 602 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 602 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. The embodiments are not limited in this context.

In some embodiments, apparatus 600 may comprise or be arranged to communicatively couple with a memory unit 604. Memory unit 604 may be implemented using any machine-readable or computer-readable media capable of storing data, including both volatile and non-volatile memory. For example, memory unit 604 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 604 may be included on the same integrated circuit as processor circuit 602, or alternatively some portion or all of memory unit 604 may be disposed on an integrated circuit or other medium, for example a hard disk drive, that is external to the integrated circuit of processor circuit 602. Although memory unit 604 is comprised within apparatus 600 in FIG. 6, memory unit 604 may be external to apparatus 600 in various embodiments. The embodiments are not limited in this context.

In some embodiments, apparatus 600 may comprise a file management module 606. File management module 606 may comprise logic, circuitry, and/or instructions operative to manage and/or facilitate the storage of—and/or access to—one or more files of a storage system comprising apparatus 600. In various embodiments, file management module 606 may comprise and/or implement a file system for the storage system. In some embodiments, the file system may define one or more levels of indirection that are applicable to file storage and/or access. In some embodiments, for example, file management module 606 may comprise and/or implement a file system according to which, for each volume of the storage system, a set of index nodes is defined that comprise indirect references to the actual data blocks of that volume. In various embodiments, file management module 606 may be operative to manage and/or facilitate the storage of—and/or access to—one or more files on one or more local storage devices. In some embodiments, file management module 606 may additionally or alternatively be operative to manage and/or facilitate the storage of—and/or access to—one or more files on one or more remote storage devices. The embodiments are not limited in this context.

FIG. 6 also illustrates a block diagram of a system 640. System 640 may comprise any of the aforementioned elements of apparatus 600. System 640 may further comprise a storage array 645. Storage array 645 may comprise a set of physical storage devices, such as a set of hard disks and/or tape devices, and some or all of the storage resources of those physical storage devices may be allocated among one or more volumes. In various embodiments, file management module 606 may be operative to manage and/or facilitate the storage of—and/or access to—one or more files on one or more volumes on storage array 645. The embodiments are not limited in this context.

In various embodiments, file management module 606 may be operative to manage the generation and/or use of snapshots of a file system. In some embodiments, in conjunction with snapshot management, file management module 606 may be operative to maintain one or more snapshot attribute sets 608. In various embodiments, each snapshot attribute set 608 may be associated with a different one of a plurality of allowable snapshot IDs. For example, in an embodiment in which there are a total of 256 snapshot ID values that can be assigned to snapshots, file management module 606 may be operative to maintain up to 256 snapshot attribute sets 608. In some embodiments, at the time of creation of any given snapshot, file management module 606 may be operative to assign a snapshot generation ID 610 to that snapshot. In various embodiments, file management module 606 may be operative to store the snapshot generation ID 610 in a snapshot attribute set 608 for the snapshot. In some embodiments, file management module 606 may store the snapshot generation ID 610 in a snapshot attribute set 608 that is associated with a snapshot ID for the snapshot.

In various embodiments, in conjunction with facilitating client access to files of the file system, file management module 606 may be operative to store file information sets 614 in an in-core cache 612. In some embodiments, in-core cache 612 may be the same as—or similar to—in-core cache 102 of FIGS. 1-3 and 5. In various embodiments, file information sets 614 may be the same as—or similar to—file information sets 104-1, 104-2, and/or 304 of FIG. 5. In some embodiments, file management module 606 may populate the file handles of any file information sets 614 associated with a given snapshot with the snapshot generation ID 610 of that snapshot. In various embodiments, file management module 606 may subsequently use the snapshot generation IDs comprised in the file handles of file information sets 614 to validate file information sets 614. In some embodiments, validating any given file information set 614 may comprise determining, based on the snapshot generation ID comprised in its file handle, whether that file information set is associated with a stale snapshot. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 7:
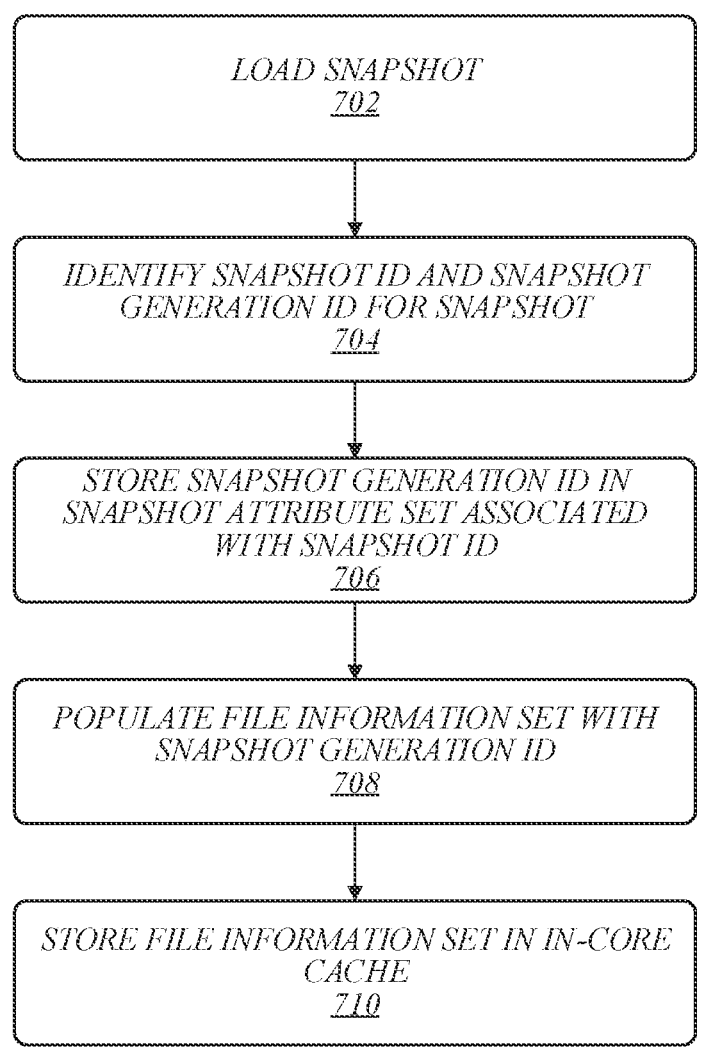
FIG. 7 illustrates one embodiment of a first logic flow.

FIG. 7 illustrates one embodiment of a logic flow 700, which may be representative of operations executed in one or more embodiments described herein. For example, logic flow 700 may be representative of operations that may be performed in some embodiments by apparatus 600 of FIG. 6 in conjunction with the implementation of one or more of the disclosed techniques for asynchronous snapshot invalidation. As shown in logic flow 700, a snapshot may be loaded at 702. For example, file management module 606 of FIG. 6 may be operative to load a snapshot of a file system. At 704, a snapshot ID and a snapshot generation ID for the snapshot may be identified. For example, file management module 606 of FIG. 6 may be operative to identify a snapshot generation ID 610 for the snapshot, as well as a snapshot ID for the snapshot.

At 706, the snapshot generation ID may be stored in a snapshot attribute set associated with the snapshot ID. For example, file management module 606 of FIG. 6 may be operative to store the snapshot generation ID 610 for the snapshot in a snapshot attribute set 608 associated with the snapshot ID for the snapshot. At 708, a file information set may be populated with the snapshot generation ID. For example, file management module 606 of FIG. 6 may be operative to populate a file information set 614 with the snapshot generation ID 610 for the snapshot. At 710, the file information set may be stored in an in-core cache. For example, file management module 606 of FIG. 6 may be operative to store the file information set 614 populated with the snapshot generation ID 610 in in-core cache 612. The embodiments are not limited to these examples.

Figure 8:
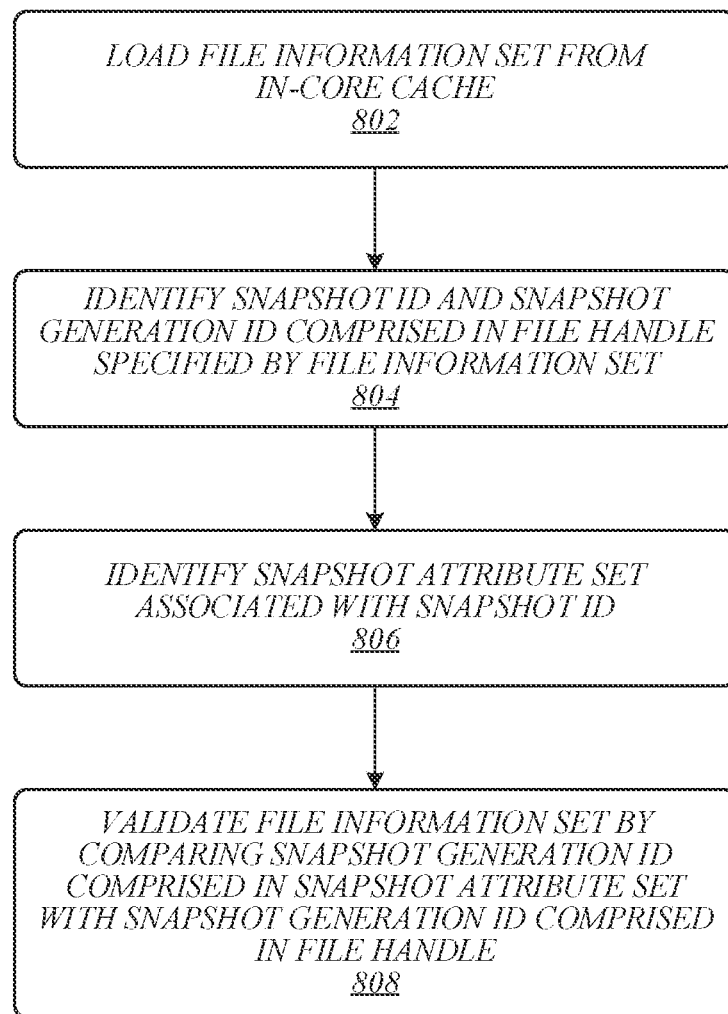
FIG. 8 illustrates one embodiment of a second logic flow.

FIG. 8 illustrates one embodiment of a logic flow 800, which may be representative of operations executed in one or more embodiments described herein. For example, logic flow 800 may be representative of operations that may be performed in some embodiments by apparatus 600 of FIG. 6 in conjunction with the implementation of one or more of the disclosed techniques for asynchronous snapshot invalidation. As shown in logic flow 800, a file information set may be loaded from an in-core cache at 802. For example, file management module 606 of FIG. 6 may be operative to load a file information set 614 from in-core cache 612. At 804, a snapshot ID and a snapshot generation ID comprised in a file handle specified by the file information set. For example, file management module 606 of FIG. 6 may be operative to identify a snapshot ID and a snapshot generation ID comprised in a file handle of the loaded file information set 614. At 806, a snapshot attribute set associated with the snapshot ID may be identified. For example, file management module 606 of FIG. 6 may be operative to identify a snapshot attribute set 608 associated with the snapshot ID identified at 804. At 808, the file information set may be validated by comparing a snapshot generation ID comprised in the snapshot attribute set with the snapshot generation ID comprised in the file handle. For example, file management module 606 of FIG. 6 may be operative to validate the loaded file information set 614 by comparing a snapshot generation ID 610 comprised in the snapshot attribute set 608 identified at 806 with the snapshot generation ID identified at 804. The embodiments are not limited to these examples.

FIG. 9 illustrates an embodiment of a storage medium 900. Storage medium 900 may comprise any non-transitory computer-readable storage medium or machine-readable storage medium, such as an optical, magnetic or semiconductor storage medium. In various embodiments, storage medium 900 may comprise an article of manufacture. In some embodiments, storage medium 900 may store computer-executable instructions, such as computer-executable instructions to implement one or both of logic flow 700 of FIG. 7 and logic flow 800 of FIG. 8. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 10:
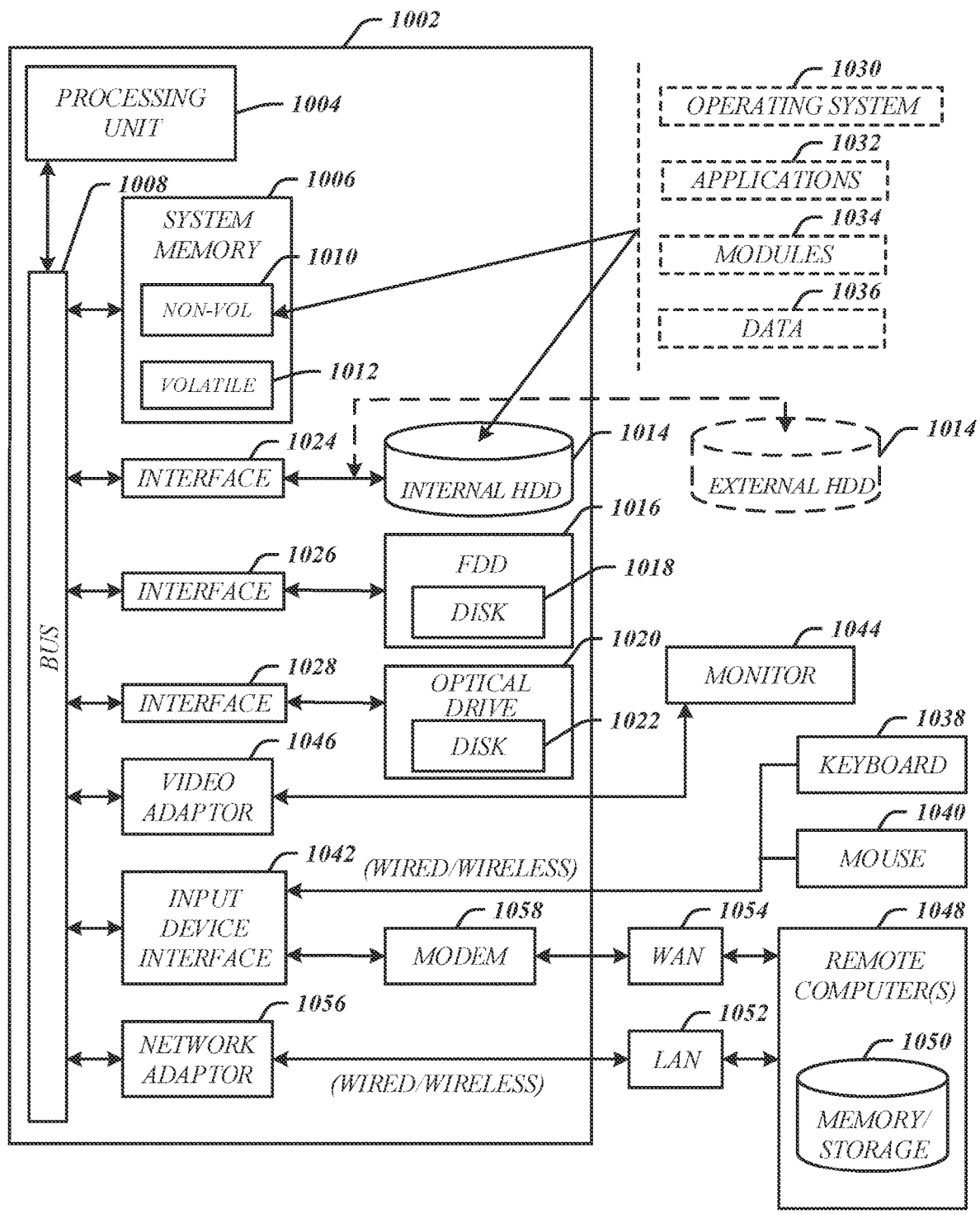
FIG. 10 illustrates one embodiment of a computing architecture.

FIG. 10 illustrates an embodiment of an exemplary computing architecture 1000 suitable for implementing various embodiments as previously described. In various embodiments, the computing architecture 1000 may comprise or be implemented as part of an electronic device. In some embodiments, the computing architecture 1000 may be representative, for example, of a file server appliance that implements one or more of apparatus 600 of FIG. 6, logic flow 700 of FIG. 7, logic flow 800 of FIG. 8, and storage medium 900 of FIG. 9. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors.

Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the apparatus 600.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
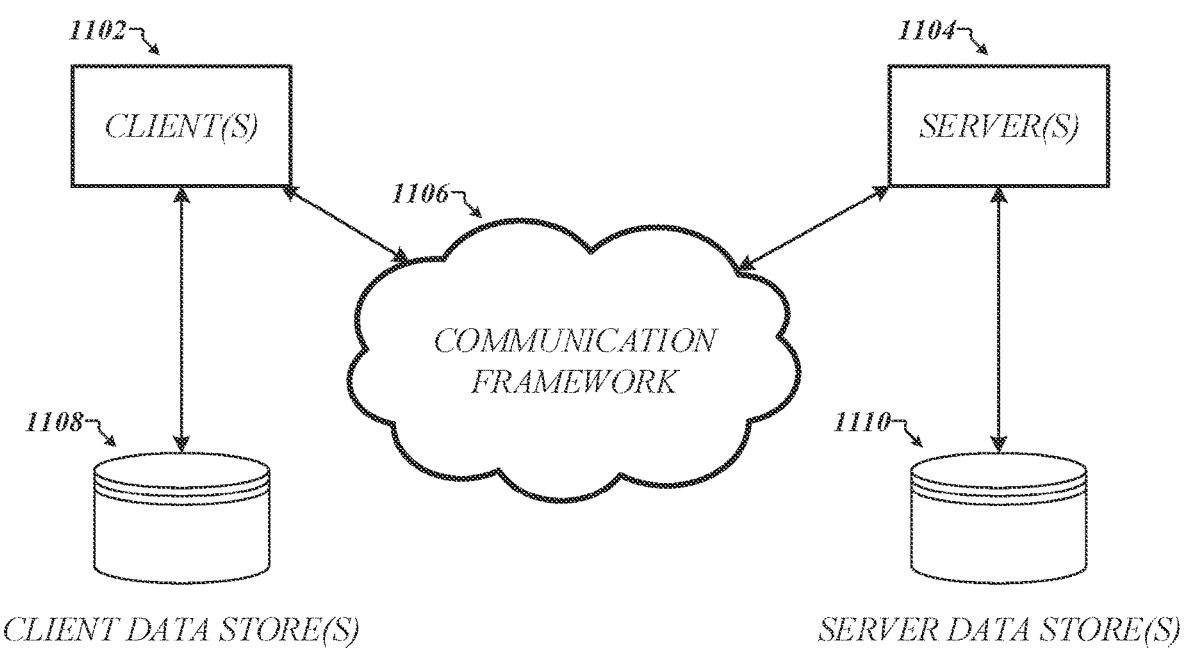
FIG. 11 illustrates one embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 and the servers 1104 are operatively connected to one or more respective client data stores 1108 and server data stores 1110 that can be employed to store information local to the respective clients 1102 and servers 1104, such as cookies and/or associated contextual information. Any one of clients 1102 and/or servers 1104 may implement one or more of logic flow 700 of FIG. 7, logic flow 800 of FIG. 8, and storage medium 900 of FIG. 9 in conjunction with storage of information on any of client data stores 1108 and/or server data stores 1110.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a method, comprising loading, by a storage server, a first snapshot of a file system, storing a snapshot generation identifier (ID) of the first snapshot in a snapshot attribute set associated with a snapshot ID for the first snapshot, and storing a first file information set in an in-core cache, the first file information set associated with the first snapshot, the first file information set to specify a first file handle associated with a file, the first file handle to comprise a file ID for the file, the snapshot ID for the first snapshot, and the snapshot generation ID of the first snapshot.

Example 2 is the method of Example 1, comprising loading the first file information set from the in-core cache, identifying the snapshot attribute set associated with the snapshot ID comprised in the first file handle, and validating the first file information set by comparing the snapshot generation ID comprised in the first file handle with a snapshot generation ID comprised in the identified snapshot attribute set.

Example 3 is the method of Example 2, comprising determining that the first file information set is stale in response to a determination that the snapshot generation ID comprised in the first file handle does not match the snapshot generation ID comprised in the identified snapshot attribute set.

Example 4 is the method of Example 3, comprising asynchronously clearing the first file information set from the in-core cache in response to the determination that the first file information set is stale.

Example 5 is the method of Example 2, comprising determining that the first file information set is not stale in response to a determination that the snapshot generation ID comprised in the first file handle matches the snapshot generation ID comprised in the identified snapshot attribute set.

Example 6 is the method of any of Examples 1 to 5, comprising storing a second file information set in the in-core cache, the second file information set associated with a second snapshot of the file system, the second file information set to specify a second file handle associated with the file, the second file handle to comprise the file ID and snapshot ID comprised in the first file handle and a snapshot generation ID differing from the snapshot generation ID comprised in the first file handle.

Example 7 is the method of Example 6, comprising maintaining the first file information set in the in-core cache while storing the second file information set in the in-core cache.

Example 8 is the method of any of Examples 1 to 7, comprising assigning the snapshot ID for the first snapshot to a second snapshot of the file system while maintaining the first file information set in the in-core cache.

Example 9 is the method of any of Examples 1 to 8, the first file handle to comprise a file system ID for the file system.

Example 10 is the method of any of Examples 1 to 9, the snapshot generation ID to comprise 32 bits or 64 bits.

Example 11 is the method of Example 10, the snapshot generation ID to comprise an unsigned 32-bit or 64-bit number.

Example 12 is the method of any of Examples 1 to 11, the snapshot generation ID to comprise a monotonically-increasing parameter.

Example 13 is the method of any of Examples 1 to 12, the snapshot ID to comprise one of 256 possible values.

Example 14 is the method of any of Examples 1 to 13, the snapshot ID to comprise 8 bits.

Example 15 is at least one non-transitory computer-readable storage medium comprising a set of instructions that, in response to being executed on a computing device, cause the computing device to perform a method according to any of Examples 1 to 14.

Example 16 is an apparatus, comprising means for performing a method according to any of Examples 1 to 14.

Example 17 is the apparatus of Example 16, comprising at least one memory, and at least one processor.

Example 18 is a non-transitory machine-readable medium having stored thereon instructions for performing a file management method, comprising machine-executable code which when executed by at least one machine, causes the machine to load a first snapshot of a file system, store a snapshot generation identifier (ID) of the first snapshot in a snapshot attribute set associated with a snapshot ID for the first snapshot, and store a first file information set in an in-core cache, the first file information set associated with the first snapshot, the first file information set to specify a first file handle associated with a file, the first file handle to comprise a file ID for the file, the snapshot ID for the first snapshot, and the snapshot generation ID of the first snapshot.

Example 19 is the non-transitory machine-readable medium of Example 18, comprising machine-executable code which when executed by the at least one machine, causes the machine to load the first file information set from the in-core cache, identify the snapshot attribute set associated with the snapshot ID comprised in the first file handle, and validate the first file information set by comparing the snapshot generation ID comprised in the first file handle with a snapshot generation ID comprised in the identified snapshot attribute set.

Example 20 is the non-transitory machine-readable medium of Example 19, comprising machine-executable code which when executed by the at least one machine, causes the machine to determine that the first file information set is stale in response to a determination that the snapshot generation ID comprised in the first file handle does not match the snapshot generation ID comprised in the identified snapshot attribute set.

Example 21 is the non-transitory machine-readable medium of Example 20, comprising machine-executable code which when executed by the at least one machine, causes the machine to asynchronously clear the first file information set from the in-core cache in response to the determination that the first file information set is stale.

Example 22 is the non-transitory machine-readable medium of Example 19, comprising machine-executable code which when executed by the at least one machine, causes the machine to determine that the first file information set is not stale in response to a determination that the snapshot generation ID comprised in the first file handle matches the snapshot generation ID comprised in the identified snapshot attribute set.

Example 23 is the non-transitory machine-readable medium of any of Examples 18 to 22, comprising machine-executable code which when executed by the at least one machine, causes the machine to store a second file information set in the in-core cache, the second file information set associated with a second snapshot of the file system, the second file information set to specify a second file handle associated with the file, the second file handle to comprise the file ID and snapshot ID comprised in the first file handle and a snapshot generation ID differing from the snapshot generation ID comprised in the first file handle.

Example 24 is the non-transitory machine-readable medium of Example 23, comprising machine-executable code which when executed by the at least one machine, causes the machine to maintain the first file information set in the in-core cache while storing the second file information set in the in-core cache.

Example 25 is the non-transitory machine-readable medium of any of Examples 18 to 24, comprising machine-executable code which when executed by the at least one machine, causes the machine to assign the snapshot ID for the first snapshot to a second snapshot of the file system while maintaining the first file information set in the in-core cache.

Example 26 is the non-transitory machine-readable medium of any of Examples 18 to 25, the first file handle to comprise a file system ID for the file system.

Example 27 is the non-transitory machine-readable medium of any of Examples 18 to 26, the snapshot generation ID to comprise 32 bits or 64 bits.

Example 28 is the non-transitory machine-readable medium of Example 27, the snapshot generation ID to comprise an unsigned 32-bit or 64-bit number.

Example 29 is the non-transitory machine-readable medium of any of Examples 18 to 28, the snapshot generation ID to comprise a monotonically-increasing parameter.

Example 30 is the non-transitory machine-readable medium of any of Examples 18 to 29, the snapshot ID to comprise one of 256 possible values.

Example 31 is the non-transitory machine-readable medium of any of Examples 18 to 30, the snapshot ID to comprise 8 bits.

Example 32 is a computing device, comprising a memory containing a machine-readable medium comprising machine-executable code, having stored thereon instructions for performing a file management method, and a processor coupled to the memory, the processor configured to execute the machine-executable code to cause the processor to load a first snapshot of a file system, store a snapshot generation identifier (ID) of the first snapshot in a snapshot attribute set associated with a snapshot ID for the first snapshot, and store a first file information set in an in-core cache, the first file information set associated with the first snapshot, the first file information set to specify a first file handle associated with a file, the first file handle to comprise a file ID for the file, the snapshot ID for the first snapshot, and the snapshot generation ID of the first snapshot.

Example 33 is the computing device of Example 32, the processor configured to execute the machine-executable code to cause the processor to load the first file information set from the in-core cache, identify the snapshot attribute set associated with the snapshot ID comprised in the first file handle, and validate the first file information set by comparing the snapshot generation ID comprised in the first file handle with a snapshot generation ID comprised in the identified snapshot attribute set.

Example 34 is the computing device of Example 33, the processor configured to execute the machine-executable code to cause the processor to determine that the first file information set is stale in response to a determination that the snapshot generation ID comprised in the first file handle does not match the snapshot generation ID comprised in the identified snapshot attribute set.

Example 35 is the computing device of Example 34, the processor configured to execute the machine-executable code to cause the processor to asynchronously clear the first file information set from the in-core cache in response to the determination that the first file information set is stale.

Example 36 is the computing device of Example 33, the processor configured to execute the machine-executable code to cause the processor to determine that the first file information set is not stale in response to a determination that the snapshot generation ID comprised in the first file handle matches the snapshot generation ID comprised in the identified snapshot attribute set.

Example 37 is the computing device of any of Examples 32 to 36, the processor configured to execute the machine-executable code to cause the processor to store a second file information set in the in-core cache, the second file information set associated with a second snapshot of the file system, the second file information set to specify a second file handle associated with the file, the second file handle to comprise the file ID and snapshot ID comprised in the first file handle and a snapshot generation ID differing from the snapshot generation ID comprised in the first file handle.

Example 38 is the computing device of Example 37, the processor configured to execute the machine-executable code to cause the processor to maintain the first file information set in the in-core cache while storing the second file information set in the in-core cache.

Example 39 is the computing device of any of Examples 32 to 38, the processor configured to execute the machine-executable code to cause the processor to assign the snapshot ID for the first snapshot to a second snapshot of the file system while maintaining the first file information set in the in-core cache.

Example 40 is the computing device of any of Examples 32 to 39, the first file handle to comprise a file system ID for the file system.

Example 41 is the computing device of any of Examples 32 to 40, the snapshot generation ID to comprise 32 bits or 64 bits.

Example 42 is the computing device of Example 41, the snapshot generation ID to comprise an unsigned 32-bit or 64-bit number.

Example 43 is the computing device of any of Examples 32 to 42, the snapshot generation ID to comprise a monotonically-increasing parameter.

Example 44 is the computing device of any of Examples 32 to 43, the snapshot ID to comprise one of 256 possible values.

Example 45 is the computing device of any of Examples 32 to 44, the snapshot ID to comprise 8 bits.

Example 46 is a system, comprising a computing device according to any of Examples 32 to 45, and at least one storage device.

Example 47 is an apparatus, comprising means for loading a first snapshot of a file system, means for storing a snapshot generation identifier (ID) of the first snapshot in a snapshot attribute set associated with a snapshot ID for the first snapshot, and means for storing a first file information set in an in-core cache, the first file information set associated with the first snapshot, the first file information set to specify a first file handle associated with a file, the first file handle to comprise a file ID for the file, the snapshot ID for the first snapshot, and the snapshot generation ID of the first snapshot.

Example 48 is the apparatus of Example 47, comprising means for loading the first file information set from the in-core cache, means for identifying the snapshot attribute set associated with the snapshot ID comprised in the first file handle, and means for validating the first file information set by comparing the snapshot generation ID comprised in the first file handle with a snapshot generation ID comprised in the identified snapshot attribute set.

Example 49 is the apparatus of Example 48, comprising means for determining that the first file information set is stale in response to a determination that the snapshot generation ID comprised in the first file handle does not match the snapshot generation ID comprised in the identified snapshot attribute set.

Example 50 is the apparatus of Example 49, comprising means for asynchronously clearing the first file information set from the in-core cache in response to the determination that the first file information set is stale.

Example 51 is the apparatus of Example 48, comprising means for determining that the first file information set is not stale in response to a determination that the snapshot generation ID comprised in the first file handle matches the snapshot generation ID comprised in the identified snapshot attribute set.

Example 52 is the apparatus of any of Examples 47 to 51, comprising means for storing a second file information set in the in-core cache, the second file information set associated with a second snapshot of the file system, the second file information set to specify a second file handle associated with the file, the second file handle to comprise the file ID and snapshot ID comprised in the first file handle and a snapshot generation ID differing from the snapshot generation ID comprised in the first file handle.

Example 53 is the apparatus of Example 52, comprising means for maintaining the first file information set in the in-core cache while storing the second file information set in the in-core cache.

Example 54 is the apparatus of any of Examples 47 to 53, comprising means for assigning the snapshot ID for the first snapshot to a second snapshot of the file system while maintaining the first file information set in the in-core cache.

Example 55 is the apparatus of any of Examples 47 to 54, the first file handle to comprise a file system ID for the file system.

Example 56 is the apparatus of any of Examples 47 to 55, the snapshot generation ID to comprise 32 bits or 64 bits.

Example 57 is the apparatus of Example 56, the snapshot generation ID to comprise an unsigned 32-bit or 64-bit number.

Example 58 is the apparatus of any of Examples 47 to 57, the snapshot generation ID to comprise a monotonically-increasing parameter.

Example 59 is the apparatus of any of Examples 47 to 58, the snapshot ID to comprise one of 256 possible values.

Example 60 is the apparatus of any of Examples 47 to 59, the snapshot ID to comprise 8 bits.

Example 61 is a system, comprising an apparatus according to any of Examples 47 to 60, at least one memory, and at least one processor.

Example 62 is the system of Example 61, comprising at least one storage device.

Example 63 is the system of any of Examples 61 to 62, comprising at least one bus, and at least one network interface.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, novel subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A data storage system, comprising:
   a memory unit storing instructions;
   a processor circuit executing the instructions to implement a file management module;

a storage array of persistent storage storing a volume managed by the file management module;

an in-core cache storing file information sets created by the file management module; and the file management module managing generation and use of snapshots of a file system associated with the volume, wherein the file management module:

maintains snapshot attribute sets of snapshot attributes that include snapshot identifiers of snapshots of the volume;

assigns snapshot generation identifiers to the snapshots, wherein the snapshot generation identifiers are stored within snapshot attribute sets associated with the snapshot identifiers of the snapshots; and utilizes the file information sets and the snapshot attribute sets to validate a snapshot.

2. The data storage system of claim 1, wherein the file management module:

defines one or more levels of indirection that are applicable to file storage and access; and implements a set of index nodes to comprise indirect references to data blocks of the volume.

3. The data storage system of claim 1, wherein the file management module:

determines whether a file information set is associated with a stale snapshot based upon a snapshot generation identifier within a file handle; and retains the file information set within the in-core cache for subsequent asynchronous deletion.

4. The data storage system of claim 1, wherein the file management module:

validate a loaded file information set by comparing a snapshot generation identifier within a snapshot attribute set.

5. The data storage system of claim 1, wherein values of the snapshot generation identifiers differ amongst a set of file handles, and wherein values of file identifiers do not differ between the set of file handles, and wherein the data storage system differentiates between a first file information set and a second file information set based upon the first file information set and the second file information set being assigned different snapshot identifiers.

6. The data storage system of claim 1, wherein values of the snapshot generation identifiers differ amongst a set of file handles, and wherein values of snapshot identifiers do not differ between the set of file handles, and wherein the data storage system differentiates between a first file information set and a second file information set based upon the first file information set and the second file information set being assigned different snapshot generation identifiers.

7. The data storage system of claim 1, wherein values of the snapshot generation identifiers differ amongst a set of file handles, and wherein values of generation identifiers do not differ between the set of file handles, and wherein the data storage system differentiates between a first file information set and a second file information set based upon the first file information set and the second file information set being assigned different snapshot identifiers.

8. The data storage system of claim 1, wherein values of the snapshot generation identifiers differ amongst a set of file handles, and wherein values of generation identifiers, values of snapshot identifiers, and values of file identifiers do not differ between the set of file handles, and wherein the data storage system differentiates between different file information sets based upon the file information sets being assigned different snapshot identifiers.

9. The data storage system of claim 1, wherein values of snapshot identifiers are constrained to a range of permitted values.

10. The data storage system of claim 1, wherein the file management module:

asynchronously clears stale file information sets from the in-core cache.

11. The data storage system of claim 1, wherein the file management module:

utilizes differing snapshot generation identifiers to resolve ambiguity regarding file information sets corresponding to two snapshots that share a same snapshot identifier.

12. A method, implemented by a processor of a data storage system, comprising:

storing file information sets created by a file management module within an in-core cache; and managing, by the file management module, generation and use of snapshots of a file system associated with a volume stored within a storage array of persistent storage by:

maintaining snapshot attribute sets of snapshot attributes that include snapshot identifiers of snapshots of the volume;

assigning snapshot generation identifiers to the snapshots, wherein the snapshot generation identifiers are stored within snapshot attribute sets associated with the snapshot identifiers of the snapshots; and utilizing the file information sets and the snapshot attribute sets to validate a snapshot.

13. The method of claim 12, comprising:

defining one or more levels of indirection that are applicable to file storage and access; and implementing a set of index nodes to comprise indirect references to data blocks of the volume.

14. The method of claim 12, comprising:

determining whether a file information set is associated with a stale snapshot based upon a snapshot generation identifier within a file handle; and retaining the file information set within the in-core cache for subsequent asynchronous deletion.

15. The method of claim 12, comprising:

validating a loaded file information set by comparing a snapshot generation identifier within a snapshot attribute set.

16. The method of claim 12, wherein values of the snapshot generation identifiers differ amongst a set of file handles, and wherein values of file identifiers do not differ between the set of file handles, and wherein the data storage system differentiates between a first file information set and a second file information set based upon the first file information set and the second file information set being assigned different snapshot identifiers.

17. The method of claim 12, wherein values of the snapshot generation identifiers differ amongst a set of file handles, and wherein values of snapshot identifiers do not differ between the set of file handles, and wherein the data storage system differentiates between a first file information set and a second file information set based upon the first file information set and the second file information set being assigned different snapshot generation identifiers.

18. The method of claim 12, wherein values of the snapshot generation identifiers differ amongst a set of file handles, and wherein values of generation identifiers do not differ between the set of file handles, and wherein the data storage system differentiates between a first file information set and a second file information set based upon the first file information set and the second file information set being assigned different snapshot identifiers.

19. The method of claim 12, wherein values of the snapshot generation identifiers differ amongst a set of file handles, and wherein values of generation identifiers, values of snapshot identifiers, and values of file identifiers do not differ between the set of file handles, and wherein the data storage system differentiates between different file information sets based upon the file information sets being assigned different snapshot identifiers.

20. A non-transitory machine readable medium comprising instructions, which when executed by a machine, causes the machine to perform operations including:
  storing file information sets created by a file management module within an in-core cache; and
  managing, by the file management module, generation and use of snapshots of a file system associated with a volume stored within a storage array of persistent storage by:
    maintaining snapshot attribute sets of snapshot attributes that include snapshot identifiers of snapshots of the volume;
    assigning snapshot generation identifiers to the snapshots, wherein the snapshot generation identifiers are stored within snapshot attribute sets associated with the snapshot identifiers of the snapshots; and
    utilizing the file information sets and the snapshot attribute sets to validate a snapshot.

* * * * *